(12) United States Patent
Huff

(10) Patent No.: US 10,838,105 B2
(45) Date of Patent: Nov. 17, 2020

(54) OPTICAL SYSTEM FOR MONITORING THE MOVEMENT OF PEOPLE THROUGH A PASSAGEWAY

(71) Applicant: INTEGRATED DESIGN LIMITED, Feltham, Middlesex (GB)

(72) Inventor: Derek Huff, Feltham (GB)

(73) Assignee: INTEGRATED DESIGN LIMITED, Feltham (GB)

( * ) Notice: Subject to any disclaimer, the term of this patent is extended or adjusted under 35 U.S.C. 154(b) by 0 days.

(21) Appl. No.: 16/496,281

(22) PCT Filed: Apr. 17, 2018

(86) PCT No.: PCT/GB2018/050999
§ 371 (c)(1),
(2) Date: Sep. 20, 2019

(87) PCT Pub. No.: WO2018/193232
PCT Pub. Date: Oct. 25, 2018

(65) Prior Publication Data
US 2020/0041688 A1 Feb. 6, 2020

(30) Foreign Application Priority Data

Apr. 21, 2017 (GB) .................................. 1706399.1

(51) Int. Cl.
*G01V 8/20* (2006.01)
*G07C 9/38* (2020.01)
(Continued)

(52) U.S. Cl.
CPC .............. *G01V 8/20* (2013.01); *G01S 7/4863* (2013.01); *G01S 7/4865* (2013.01); *G01S 17/42* (2013.01); *G01S 17/58* (2013.01); *G07C 9/38* (2020.01)

(58) Field of Classification Search
CPC . G01V 8/22; G01V 8/10; G08B 13/18; G08B 13/183; G07C 9/00; G06K 9/00
See application file for complete search history.

(56) References Cited

U.S. PATENT DOCUMENTS 5,519,784 A * 5/1996 Vermeulen ............... G01V 8/22
382/100
5,752,215 A * 5/1998 Zaaiman ................ G08G 1/015
340/935
(Continued)

FOREIGN PATENT DOCUMENTS

FR 2882178 8/2006
WO 2007138025 12/2007

OTHER PUBLICATIONS

International Search Report and Written Opinion issued on International Application No. PCT/GB2018/050999, dated Jun. 28, 2018, 11 pages.
(Continued)

*Primary Examiner* — Luke D Ratcliffe
(74) *Attorney, Agent, or Firm* — Leber IP LAW; David C. Robertson

(57) ABSTRACT

A system for monitoring the movement of people through a passageway comprising two or more time of flight sensors deployed across the passageway in a direction substantially transverse to the direction of movement of a person or object through the passageway. The system further comprises means to determine data regarding people or objects passing through the passageway based on the time of flight of a signal measured by the two or more sensors.

18 Claims, 4 Drawing Sheets

(51) Int. Cl.
    *G01S 7/4863*     (2020.01)
    *G01S 7/4865*     (2020.01)
    *G01S 17/42*     (2006.01)
    *G01S 17/58*     (2006.01)

(56) References Cited

U.S. PATENT DOCUMENTS

| | | |
|---|---|---|
| 2003/0179127 A1 | 9/2003 | Wienand |
| 2004/0093181 A1 | 5/2004 | Lee |
| 2006/0251498 A1* | 11/2006 | Buzzoni ............... B65G 63/004 414/139.9 |
| 2013/0135438 A1 | 5/2013 | Lee et al. |

OTHER PUBLICATIONS

Combined Search and Examination Report issued on GB Application No. 1706399.1, dated Aug. 24, 2017, 5 pages.

* cited by examiner

OPTICAL SYSTEM FOR MONITORING THE MOVEMENT OF PEOPLE THROUGH A PASSAGEWAY

CROSS REFERENCE TO RELATED APPLICATION

This application is a National Stage Entry of International Patent Application No. PCT/GB2018/050999, filed Apr. 17, 2018, which claims priority from Great Britain Patent Application No. 1706399.1, filed Apr. 21, 2017, the entire disclosures of which are incorporated herein by reference.

FIELD OF INVENTION

This invention relates to the monitoring of the movement of people through a passageway. In particular, but not exclusively, the invention relates to a system for the detection of multiple persons passing through a passageway and the avoidance of false alarms or counts which may be caused by other objects, such as bags and suitcases, carried by a person moving through the passageway.

BACKGROUND

In entrance control portals, such as turnstiles, there is commonly provided a means of monitoring and allowing or preventing the movement of people through a passageway or channel, which may be provided by physical barriers, moving panels, doors, arms and the like, and indicators to show whether or not passage is authorised.

A typical use of such a portal would be where a person presents a token or some other authorising means which is verified by an access control system, and which in turn provides an authorising signal to the portal to unlock and/or move the physical barrier and to give indication of the authorisation by means of a visual or audio signal, for example. The person may then pass through the portal after which the portal will reclose and relock, and the indicator will return to its original state.

Such portals are commonly equipped with a means of monitoring the passageway in order to sense the movement of the person through the portal for the purposes of safety and security, counting the number of people passing through the passageway and timing of the reclosing and relocking of the portal.

A common problem encountered in the use of such controlled access portals, in particular for those in which it is desired to allow passage of only one person at a time, is the detection of two (or more) people attempting to gain entry using only one token or authorisation. In the case of one person walking closely behind another, this is referred to as 'tailgating', however in wider passageways problems can also be encountered in the detection of two (or more) people walking side-by-side, sometimes referred to as 'side-gating'. As such, it is desirable that the monitoring means can discriminate between, for instance, one person only and two (or more) people walking closely together in order to detect if multiple persons are attempting to pass through the passageway simultaneously.

Furthermore, it is also desirable to be able to identify for example, carried objects such as bags, briefcases, suitcases or trolleys, in order to avoid false detection of multiple persons.

Very typically infrared beams can be used as detectors for such monitoring means. Some known systems comprise time of flight cameras to monitor the presence and/or movement of people and objects through a passageway. Such time of flight cameras operate by issuing light over a field of view, which illuminates a scene and is reflected by objects in the two-dimensional field of view. Distance information can be resolved for each point of the image based on the time of flight of the reflected signals, thus providing a three-dimensional image of the illuminated scene.

Systems comprising time of flight cameras for monitoring the movement of people through a passageway rely on the reconstruction of such a three-dimensional image of a person in the passageway and applying processing to the reconstructed image to confirm the presence of a person. This process requires the camera to have a sufficient field of view to capture an image which can provide reliable information. The field of view of a camera deployed across a narrow passageway would be severely restricted and obscured at least partially and/or temporarily by a person or object passing close to the camera, thus limiting the reliability of the method for monitoring the movement of people through the passageway. It is not always possible to deploy a camera in a more beneficial position due to physical and aesthetic considerations.

SUMMARY OF INVENTION

The present invention arose in attempt to provide an improved method of monitoring the movement of people through a passageway and for the detection of a 'tailgater', and also to improve the avoidance of false alarms which may be caused by other objects present.

According to the present invention in a first aspect there is provided a system for monitoring the movement of people or objects through a passageway comprising one or more time of flight sensors deployed across the passageway in a direction substantially transverse to the direction of movement of a person or object through the passageway.

Time of flight ranging sensors comprise a transmitter of light typically in the infrared spectrum and a receiver able to detect this light reflected by an object illuminated by the transmitted light and measure the time the light has taken to travel to the object and to return to the sensor thereby giving an indication of the distance of the object.

Each sensor may be arranged to transmit a single beam of light and to receive a signal which is reflected from an illuminated area on a person or object intersecting the path of the transmitted beam. Such a sensor is configured to measure the time taken for the beam to travel to the person or object and for a reflected signal to return to the sensor. Thus, the time of flight of each sensed reflected signal is indicative of the distance from the sensor to a person or object passing through the passageway.

The system may further comprises means to determine data regarding people or objects passing through the passageway based on the time of flight of a signal measured by the one or more sensors. Said means may be configured to determine the number and direction of people or objects passing through the passageway. The present invention provides a low cost system for monitoring the movement of people through a passage way, which provides reliable discrimination between people and carried objects, such as bags, suitcases and trolleys, for example, requiring comparatively little processing power compared to existing technology. The system can be implemented for counting the number of people passing through a passageway, for example for monitoring footfall, controlling the operation of access control means within the passageway, such as doors, gates, turnstiles, among others, and for detecting the presence of unauthorised individuals, including tailgaters and sidegaters.

The system may comprise means to determine the speed at which a person or object moves through the passageway.

According to a preferred embodiment of the present invention, at least two time of flight sensors are provided, and these are located on opposing sides of the passageway in order to transmit signals in generally opposing directions across the passageway. Time of flight systems are not generally used in a situation where generally opposing beams are transmitted, since the beam transmitted by the transmitter of one sensor can be received by the receiver of an opposing sensor, causing false measurements. To prevent this, according to this embodiment of the invention, the opposing signals are transmitted and received using time-division multiplexing.

In a preferred embodiment, each sensor is configured to measure a series of one-dimensional distance data points over intervals of time. Each series of one-dimensional distance data points can be combined with the determined speed at which the person or object moves through the passageway to create a two-dimensional cross-sectional profile of a person or object passing through the passageway relative to each sensor. In this way, the system can discriminate between the profile of one person only passing through the passageway and more than one person passing through in close proximity, either in single-file or side-by-side. Further, the system can discriminate between people and carried objects, such as bags, suitcases or trolleys, for example, for the avoidance of false detection of people passing through the passageway.

The system may be configured to monitor the number of people present within the passageway.

In one embodiment, the sensors located on opposing sides of the passageway are located directly opposite to each other and the direction of travel and speed are determined by other means.

In another embodiment, at least two of the sensors are displaced in the direction of travel. That is, one sensor may be further forward in the direction of travel, than another. The system may further comprise means to determine the speed at which a person or object moves through the passageway based on the data measured by the sensors displaced in the direction of travel.

In a preferred embodiment, one or more of the sensors are deployed at a height suitable for monitoring the waist and lower torso region of an adult passing through the passageway. The height of the sensors is preferably greater than 30 cm above ground level. Monitoring is thus carried out above the foot and lower leg level, where items moving close to the ground, such as wheeled bags, trolleys and wheelchair wheels, may restrict the reliable detection of a person moving through the passageway. The height of the one or more of the sensors is more preferably 85 cm above ground level.

In a preferred embodiment, the transmitted beams comprise infrared light. In a further preferred embodiment, each transmitted beam is a single beam of laser light.

In one embodiment, the signals are transmitted at an angle perpendicular to the direction of movement of a person or object through the passageway. In a further embodiment, the signals are transmitted in a horizontal plane across the passageway.

The system may further comprise means to control the operation of components of the passageway in response to the number and/or direction of people detected passing through the passageway. For example, in one embodiment the system may comprise means to control the access of people through the passageway in response to the number and direction of people detected passing through the passageway. The means to control access of people through the passageway may be, for example, doors, gates or turnstiles, or any other such means that would restrict the passage of people through the passageway. The system may be arranged to allow access of only one person at a time through the passageway. In such a case, the system is arranged to prevent the access of people through the passageway in the event that more than one person is detected passing through the passageway. In another embodiment, the system comprises means to generate an alarm in response to the number and direction of people detected passing through the passageway. The alarm may be an audio or visual signal. The alarm may be generated, for example, in the event that more than one person is detected passing through the passageway or a person is detected moving through the passageway in an unauthorised direction.

In a further aspect of the present invention, there is provided a method for monitoring the movement of people or objects through a passageway, comprising:

positioning one or more time of flight sensors to transmit a signal across the passageway in a direction substantially transverse to the direction of movement of a person or object through the passageway;

measuring the transverse distance of a person or object intersecting the path of the signal relative to each of the one or more sensors;

determining the number and direction of people moving through the passageway based on the data measured by the one or more sensors.

According to a further aspect of the present invention, there is provided a method for monitoring the movement of people or objects through a passageway, comprising:

positioning two or more time of flight sensors to transmit a signal across the passageway in a direction substantially transverse to the direction of movement of a person or object through the passageway, wherein at least two of the sensors are located on opposing sides of the passageway;

measuring the transverse distance of a person or object intersecting the path of the signal relative to each of the sensors over a series of time intervals;

determining the speed at which the person or object moves through the passageway;

combining the series of one-dimensional distance data points obtained from each of the sensors with the determined speed at which the person or object moves through the passageway to create a two-dimensional cross-sectional profile of the person or object moving through the passageway relative to each of the sensors;

determining the number and direction of people moving through the passageway based on the two-dimensional cross-sectional profiles created from the data obtained from each of the sensors.

The method may further comprise a step of controlling the access of people through the passageway in response to the number and direction of people detected passing through the passageway. In another embodiment, the method further comprises a step of generating an alarm in response to the number and direction of people or objects detected passing through the passageway.

DESCRIPTION OF THE DRAWINGS

Embodiments of the invention will now be described, by way of example, with reference to the accompanying schematic drawings in which.

DETAILED DESCRIPTION

Figure 1A:
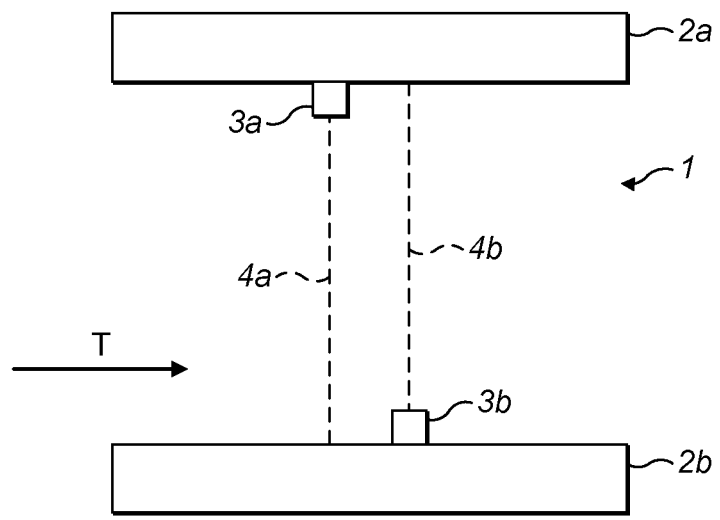
FIG. 1a shows a plan view of a system for monitoring movement of people through a passageway according to an embodiment of the present invention.

FIG. 1a shows, in plan view, a schematic representation of a passageway 1 with two lateral boundaries 2a, 2b fitted with a system for monitoring the movement of people through the passageway according to an embodiment of the present invention. The system comprises two time of flight sensors 3a, 3b arranged to transmit signal beams 4a, 4b across the passageway in a direction substantially transverse to the direction of movement of a person or object through the passageway T. In the embodiment shown in FIG. 1a, the two sensors 3a, 3b are located on opposing lateral boundaries 2a, 2b of the passageway 1 and are arranged such that the signal beams 4a, 4b are transmitted in opposing directions across the passageway 1. A typical time of flight sensor is a VL53L0X Time of Flight Ranging sensor made by STMicroelectronics®, which generates a single beam of laser light.

Where sensors are deployed in opposing directions across the passageway, it is likely that a signal transmitted by one sensor will be received by the other sensor, thus interfering with the time of flight measurements made by each sensor. In order to avoid this, each of the sensors of the system are preferably configured to transmit and receive beams using time division multiplexing. Thereby, the sensors are configured to transmit beams intermittently and in sequence such that the two or more sensors do not transmit signals simultaneously, thus avoiding interference of opposing signal beams.

Figure 1B:
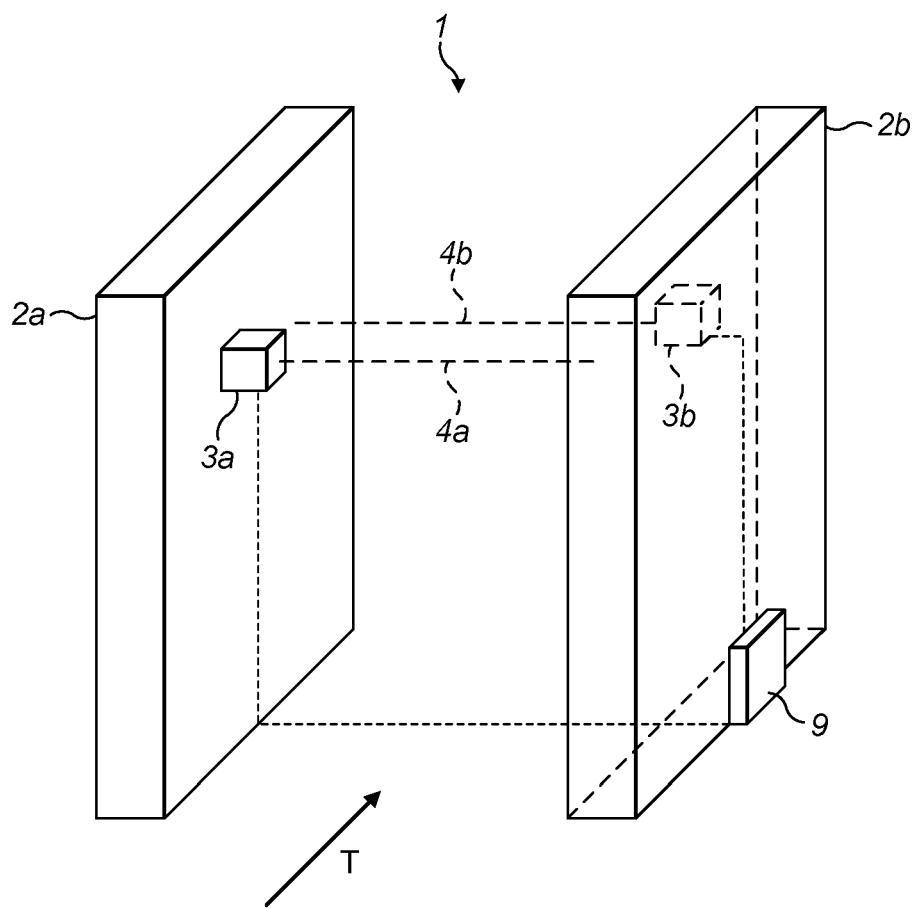
FIG. 1b shows a perspective view of a system for monitoring movement of people through a passageway according to an embodiment of the present invention.

FIG. 1b shows a schematic representation of passageway 1 in a perspective view. In the embodiment of FIG. 1b, sensors 3a, 3b are deployed on opposing lateral boundaries 2a, 2b at equal heights above ground level and are displaced in the direction of travel T. In some embodiments, the sensors may be vertically displaced such that the heights of the two sensors above ground level are not equal. In a further embodiment, the sensors 3a, 3b are located directly opposite to each other. The sensors may also be displaced both vertically and horizontally.

A person or object intersecting one or more of the signal beams 4a, 4b will cause a signal to be reflected back to the sensor from which it was transmitted. Each sensor is configured to measure the time taken for the signal to travel to the person or object and to return to the sensor. Thus, the time of flight of each sensed reflected signal is indicative of the distance from the sensor to a person or object passing through the passageway. The system thereby provides quasi-realtime distance measurement across the width of the passageway. The system further comprises a processing means 9 connected to each of the sensors and configured to receive one dimensional distance data points measured by each of the sensors and to analyse the data to determine information regarding people or objects passing through the passageway. In a preferred embodiment, the processing means are configured to determine the number and direction of people passing through the passageway in quasi-realtime.

Preferably, the sensors 3a, 3b are positioned at a height suitable for monitoring the waist and lower torso region of an adult passing through the passageway. In a preferred embodiment, the sensors are deployed at a height greater than 30 cm above ground level. More preferably, the sensors are deployed at a height greater than or equal to 60 cm and less than or equal to 120 cm above ground level. Most preferably, the sensors are deployed at a height of 85 cm above ground level, which might be considered to be a typical waist height. However, it will be appreciated by any person skilled in the art that the sensors can be arranged at any height suitable for monitoring a person passing through the passageway. In some embodiments, it may be desirable for a plurality of sensors to be arranged at a plurality of different heights across the passageway to further improve detection and discrimination.

In passageways such as those to be monitored by the present invention, the footprint of the passageway can be defined as the dimension of the passageway in the direction of travel of a person moving through the passageway.

Figure 1C:
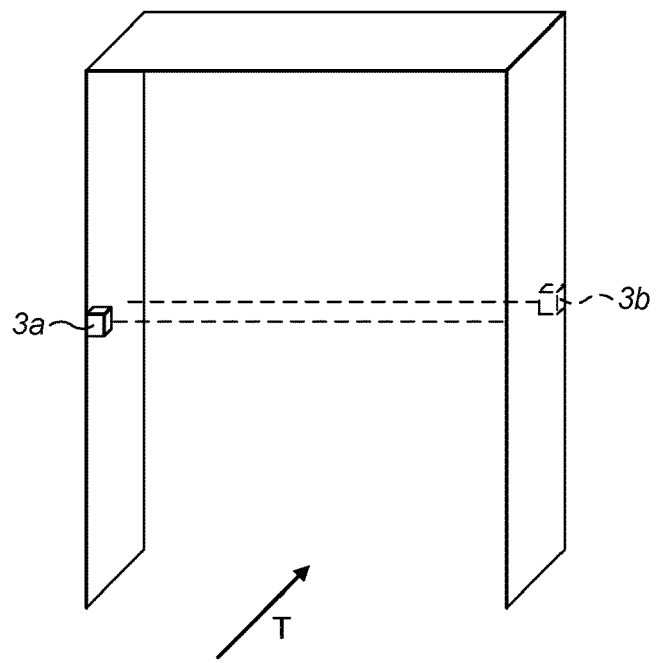
FIG. 1c shows a perspective view of a system for monitoring movement of people through a narrow doorway according to an embodiment of the present invention.

In some embodiments, it may be desirable that the sensors are displaced in the direction of travel by a distance less than the typical thickness of a person, such that two or more beams will at some point be intersected at the same time by a person passing through the passageway. This embodiment is of particular importance in small footprint passageway, such as doorways. FIG. 1c shows a schematic diagram in perspective view of a doorway across which two sensors 3a, 3b are deployed in generally opposing directions. As a person moves through the passageway, beam 4b is intersected before beam 4a ceases to be intersected. In other words, both beams 4a and 4b will be simultaneously intersected at some point by a person moving through the passageway. As such, it is not possible for a person to be positioned in between beams without intersecting at least one of the beams. In other embodiments, where the passageway has a large footprint, it may be desirable that the sensors are displaced by a larger distance, such that a person moving through the passageway will fully pass through the beam transmitted by one sensor, before intersecting the beam of the adjacent sensor.

Preferably the system comprises means to determine the speed at which a person or object passes through the passageway. In embodiments of the present invention in which two or more sensors are displaced in the direction of travel T, the speed at which a person or object passes through the passageway can be determined by correlation of data from the two or more sensors. However, it will be appreciated by any person skilled in the art that any alternative means for determining the speed at which a person or object passes through the passageway can be used.

Figure 2A:
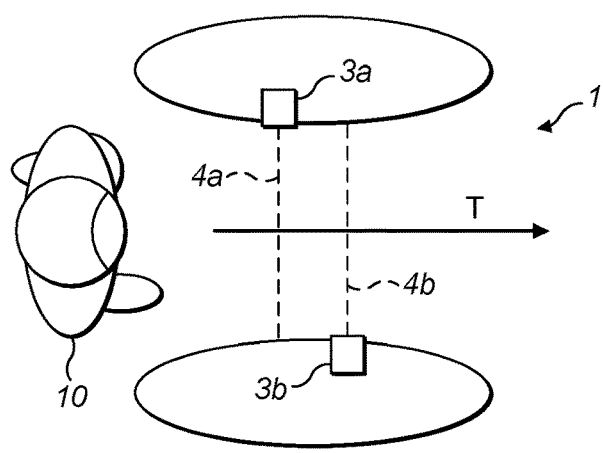
FIG. 2a shows a person passing through a passageway monitored by a system according to an embodiment of the present invention.
Figure 2B:
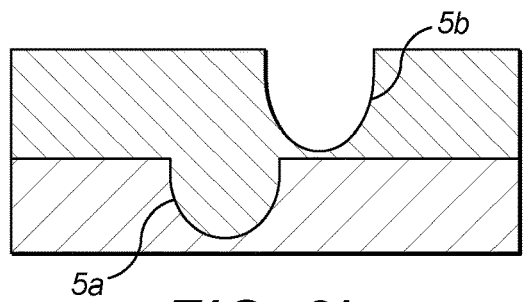
FIG. 2b shows a graphical representation of data measured by sensors over intervals of time during a person passing through a passageway, according to one embodiment of the invention.

FIGS. 2 to 4 show how the system may be used to monitor the movement of people through a passageway. FIGS. 2a and 2b show the system monitoring the movement of one person 10 through the passageway. FIG. 2a shows a person 10 moving through passageway 1, as described in relation to FIGS. 1a and 1b. FIG. 2b shows a graphical representation of data measured by sensors 3a and 3b over intervals of time to create two-dimensional cross-sectional profiles 5a and 5b relative to sensors 3a and 3b, respectively. As person 10 moves through passageway 1 in direction of travel T, person 10 first intersects beam 4a and reflects the signal back to sensor 3a, which measures the distance from the sensor at which the beam has been intersected. As person 10 continues to move through passageway 1, further distance measurements are made by sensor 3a over intervals of time. The distance measured will be dependent on the illuminated area across the cross-sectional profile of person 10 at which the beam is intersected and a signal is reflected. The processing means can combine the distance data points measured by sensor 3a over intervals of time with the determined speed at which a person or object passes through the passageway in order to create a two-dimensional cross sectional profile 5a of person 10, which is depicted graphically in FIG. 2b. Thus, the cross-sectional geometry of a person or object passing through the passageway is determined in quasi-realtime.

As person 10 continues to move through passageway 1, beam 4b is intersected and the one-dimensional distance data points are analysed by the processing means to create two-dimensional cross sectional profile 5b, as depicted graphically in FIG. 2b. In the embodiment shown in FIGS. 2a and 2b, sensors 3a and 3b are located on opposing lateral boundaries of the passageway, and thus profiles 5a and 5b correspond to opposite sides of person 10. In some embodiments, two or more sensors may be located on the same lateral boundary of the passageway, in which case the profiles created will correspond to the same side of person 10.

Figure 3A:
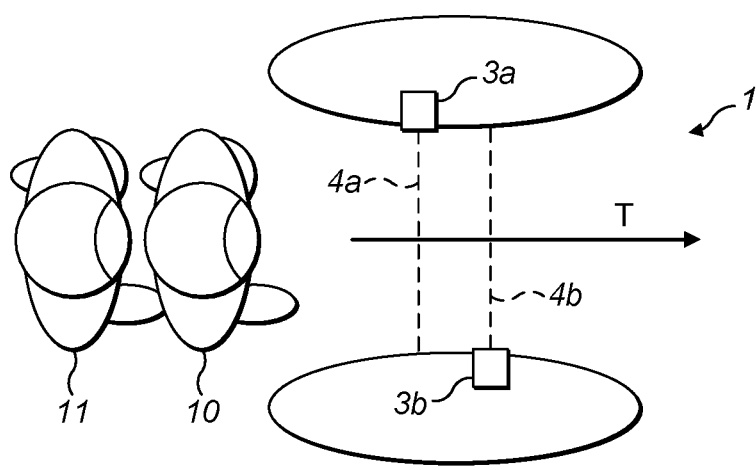
FIG. 3a shows two people in close proximity passing through a passageway monitored by a system according to an embodiment of the present invention.
Figure 3B:
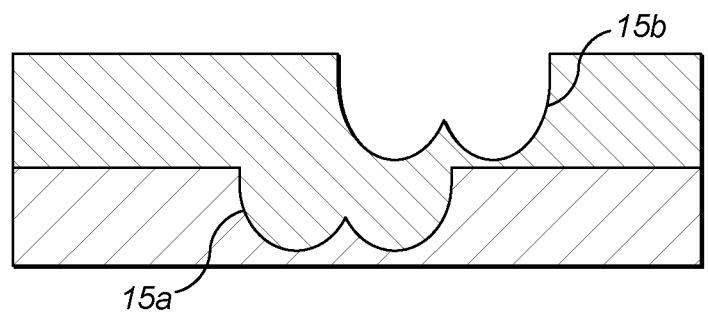
FIG. 3b shows a graphical representation of data measured by sensors over intervals of time during two people in close proximity passing through a passageway, according to one embodiment of the invention.

FIG. 3a shows a scenario in which both person 10 and person 11 move passageway 1 in direction of travel T in close proximity to each other. FIG. 3b shows a graphical representation of data measured by sensors 3a and 3b over intervals of time and analysed by the processing means to create two-dimensional cross-sectional profiles 15a and 15b relative to sensors 3a and 3b, respectively. As shown in FIG. 3b, profiles 15a and 15b provide a graphical representation of both person 10 and person 11 moving through the passageway, thereby the system is able to detect that two people are moving through the passageway. Furthermore, the system can differentiate this scenario from that of profiles 5a and 5b, wherein only one person 10 is moving through the passageway.

Figure 4A:
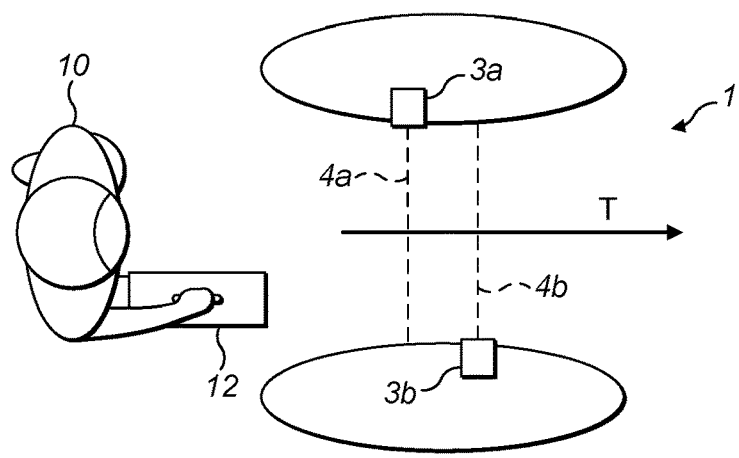
FIG. 4a shows a person carrying a bag passing through a passageway monitored by a system according to an embodiment of the present invention.
Figure 4B:
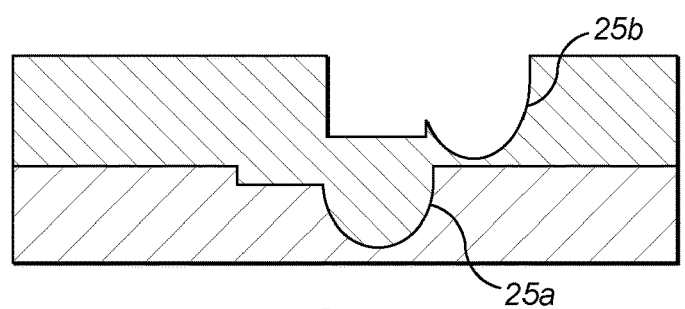
FIG. 4b shows a graphical representation of data measured by sensors over intervals of time during a person carrying a bag passing through a passageway, according to one embodiment of the invention.

FIG. 4a shows a scenario in which person 10 moves through passageway 1 carrying a bag 12. FIG. 4b shows a graphical representation of data measured by sensors 3a and 3b over intervals of time and analysed by the processing means to create two-dimensional cross-sectional profiles 25a and 25b relative to sensors 3a and 3b, respectively. As shown in FIG. 4b, profiles 25a and 25b differ from profiles 5a, 5b and 15a, 15b and the system can thereby differentiate this scenario from those of both FIG. 2b and FIG. 3b. Thus, the system can discriminate between two people passing through the passageway in close proximity and one person passing through with carried objects.

The creation of a two-dimensional cross-sectional profile, as discussed in relation to FIGS. 2 to 4, allows the number of people passing through a passageway to be determined accurately whilst avoiding false positives arising from carried objects.

In the embodiment shown in FIGS. 2 to 4, the sensors are displaced in the direction of travel T. The speed of a person or object moving through the passageway can therefore be determined from the data received from the sensors displaced in the direction of travel. Thus, the dimension of the person or object in the direction of travel can also be determined.

In a further embodiment of the present invention, two or more sensors deployed on opposing lateral boundaries of the passageway provide a means to detect two people passing through the passageway side-by-side, where the passageway is sufficiently wide to allow such passage. For example, it is possible to measure the total obscured width based on distance measurements made by two directly opposing sensors and to determine if the total obscured width is greater than the expected with of a single person. However, further processing means are required in order to discriminate between people and objects within the passageway. Therefore, according to the present invention, there is provided a system suitable for application in such wide access passageways, comprising means to determine the speed at which a person or object moves through the passageway and to combine this information with a series of one-dimensional distance data points measure by each sensor over intervals of time, to create a two-dimensional cross-sectional profile of the person or object passing through the passageway relative to each sensors. As described above, this provides reliable detection of people within the passageway, whilst avoiding false positive arising from carried objects also present in the passageway. The system is thereby greatly improved relative to a simple measurement of total obscured width.

Figure 5:
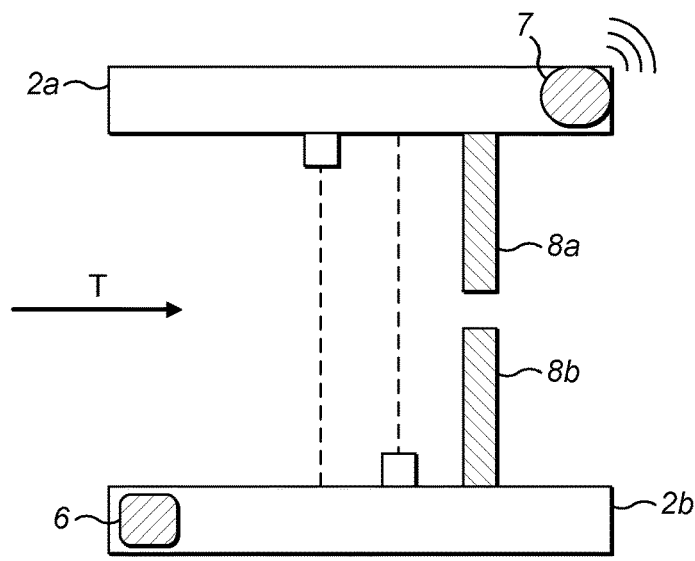
FIG. 5 shows a system for monitoring movement of people through a passageway according to an embodiment of the present invention, comprising an alarm and means to control access of people through the passageway.

FIG. 5 shows a system according to the present invention, wherein the passageway is provided with an authorisation unit 6, an alarm 7 and a means to control the access of people through the passageway 8a, 8b. The alarm 7 may be an audio or visual signal, or any other means to draw the attention of operators of the passageway. The access control means 8a, 8b may be a gate, a turnstile, a barrier, a revolving door, or any other such means to control the access of people through the passageway. The processing means may be configured to issue a control instruction to either or both of the alarm 7 and access control means 8a, 8b according to the information output from the analysis of the sensor signals. For example, authorisation unit 6 may be configured to accept a token to authorise the passage of one person through the passage. The token may be a physical or electronic ticket, an access card, a contactless payment card, a coin or any other such means which may be used to authorise access of a person. A biometric reader may alternatively or additionally be used. The system may then monitor the passageway 1 to determine the number and direction of people passing through the passageway. In one embodiment the alarm 7 may be activated in the event that the processing means detects more than one person passing through the passageway. In another embodiment, the access control means 8a, 8b may be configured to refuse access in the event that more than one person is detected passing through the passageway. In a further embodiment, the system may be configured to monitor the motion of people through the passageway and to issue an instruction to the access control means to close only when the processing means has determined that no further people are passing through the passageway. It will be appreciated by any person skilled in the art that the system may be configured to authorise access to any number of people and to issue instructions to the alarm and/or access control means in the event that this number of people has passed through the passageway.

The figures and description herein relate to embodiments of the present invention wherein two sensors are deployed for monitoring the movement of people through a passageway. In alternative embodiments, any number of sensors may be deployed across the passageway in a direction substantially transverse to the direction of movement of a person or object through the passageway and the distance data retrieved from the plurality of sensors may be combined in order to monitor the movement of people through the passageway.

The invention claimed is:

1. A system for monitoring the movement of people through a passageway comprising:
    two or more time of flight ranging sensors deployed across the passageway in a direction substantially transverse to the direction of movement of a person through the passageway, wherein each time of flight ranging sensor is arranged to:
        transmit a single beam of light;
        receive a signal which is reflected from an illuminated area on a person or object intersecting the path of the transmitted beam; and
        measure the time of flight of each sensed reflected signal, which is indicative of the distance from the sensor to a person or object passing through the passageway,
the system further comprising the two or more time of flight ranging sensors in communication with a processor, the processor configured to:
    determine the speed at which a person moves through the passageway; and
    determine the number and direction of people passing through the passageway based on the time of flight signals measured by the two or more time of flight ranging sensors;
wherein:
    at least two of the two or more time of flight ranging sensors are located on opposing sides of the passageway and transmit single beams in generally opposing directions across the passageway;
    each sensor of the two or more time of flight ranging sensors is configured to measure a series of one-dimensional distance data points over intervals of time, the processor being further configured to combine the one-dimensional distance data points within each series with the determined speed at which the person moves through the passageway to create a two-dimensional cross-sectional profile of said person passing through the passageway relative to each sensor; and
    the processor is configured to determine the number of people passing through the passageway based on said two-dimensional cross-sectional profiles.

2. The system according to claim 1, wherein the system is configured to monitor the number of people or objects present within the passageway.

3. The system according to claim 1, wherein at least two of the time of flight ranging sensors located on opposing sides of the passageway are located directly opposite to each other.

4. The system according to claim 1, wherein at least two of the time of flight ranging sensors are displaced in the direction of travel.

5. The system according to claim 4, wherein the two of the time of flight ranging sensors in communication with the processor are displaced in the direction of travel, and wherein the processor is further configured to determine the speed at which a person moves through the passageway based on the data measured by said two time of flight ranging sensors displaced in the direction of travel.

6. The system according to claim 1, wherein the single beams are transmitted and received by each of the two or more time of flight ranging sensors intermittently and in sequence, such that the two or more time of flight ranging sensors do not transmit signals simultaneously.

7. The system according to claim 1, wherein the time of flight ranging sensors are deployed at a height greater than 30 cm.

8. The system according to claim 1, wherein the transmitted beams comprise infrared light.

9. The system according to claim 1, wherein each transmitted beam is a single beam of laser light.

10. The system according to claim 1, wherein the beams are transmitted at an angle perpendicular to the direction of movement of a person through the passageway.

11. The system according to claim 1, wherein the beams are transmitted in a horizontal plane across the passageway.

12. The system according to claim 11, wherein the beams are transmitted at an angle perpendicular to the direction of movement of a person through the passageway.

13. The system according to claim 1, further comprising an access control apparatus in communication with the processor configured to control the access of people through the passageway in response to the number and direction of people detected passing through the passageway.

14. The system according to claim 1, further comprising an alarm apparatus in communication with the processor configured to generate an alarm in response to the number and direction of people detected passing through the passageway.

15. A method for monitoring the movement of people through a passageway, comprising:
    positioning two or more time of flight sensors to transmit a signal across the passageway in a direction substantially transverse to the direction of movement of a person through the passageway, wherein at least two of the time of flight sensors are located on opposing sides of the passageway;
    measuring the transverse distance of a person or object intersecting the path of the signal relative to each of the time of flight sensors over a series of time intervals;
    determining the speed at which the person moves through the passageway;
    combining the series of one-dimensional distance data points obtained from each of the time of flight sensors with the determined speed at which the person moves through the passageway to create a two-dimensional cross-sectional profile of the person moving through the passageway relative to each of the time of flight sensors; and
    determining the number and direction of people moving through the passageway based on the two-dimensional cross-sectional profiles created from the data obtained from each of the time of flight sensors.

16. The method according to claim 15, wherein the speed at which a person moves through the passageway is determined using data measured by two or more time of flight sensors which are displaced in the direction of movement of a person through the passageway.

17. The method according to claim 15, further comprising a step of controlling the access of people through the passageway in response to the number and direction of people detected passing through the passageway.

18. The method according to claim 15, further comprising a step of generating an alarm in response to the number and direction of people detected passing through the passageway.

* * * * *